(12) United States Patent
Callicott et al.

(10) Patent No.: US 7,846,507 B2
(45) Date of Patent: Dec. 7, 2010

(54) METHOD OF MAKING AN EASILY CLEANABLE POLYMER LAMINATE

(75) Inventors: Marten S. Callicott, Florence, SC (US);
David L. Hyde, Yerington, NV (US);
Charles M. Kausch, Akron, OH (US);
Anthony Verrocchi, Akron, OH (US);
Joe A. Wright, Tuscaloosa, AL (US);
Raymond J. Weinert, Macedonia, OH (US); Robert E. Medsker, Hartville, OH (US); Daniel D. Woodland, Munroe Falls, OH (US); Daniel C. Gottschalk, Columbus, MS (US); Edward N. Kresge, Watchung, NJ (US)

(73) Assignee: OMNOVA Solutions Inc., Fairlawn, OH (US)

( * ) Notice: Subject to any disclaimer, the term of this patent is extended or adjusted under 35 U.S.C. 154(b) by 997 days.

(21) Appl. No.: 10/966,528

(22) Filed: Oct. 15, 2004

(65) Prior Publication Data

US 2005/0048213 A1 Mar. 3, 2005

Related U.S. Application Data

(60) Continuation of application No. 09/847,909, filed on May 2, 2001, now abandoned, which is a division of application No. 09/244,711, filed on Feb. 4, 1999, now Pat. No. 6,423,418, which is a continuation-in-part of application No. 09/035,595, filed on Mar. 5, 1998, now abandoned.

(51) Int. Cl.
*B05D 7/24* (2006.01)
*B05D 7/26* (2006.01)
*B32B 15/08* (2006.01)
*B32B 23/08* (2006.01)
*B32B 27/08* (2006.01)
*B32B 27/26* (2006.01)
*B32B 27/36* (2006.01)

(52) U.S. Cl. .................................................. 427/407.1
(58) Field of Classification Search ............... 427/407.1
See application file for complete search history.

(56) References Cited

U.S. PATENT DOCUMENTS

| | | | |
|---|---|---|---|
| 3,100,722 A | 8/1963 | Herrmann | 117/138.8 |
| 3,834,823 A | 9/1974 | Seregely et al. | 401/198 |
| 3,922,457 A | 11/1975 | Barnwell et al. | 428/207 |
| 3,949,732 A | 4/1976 | Reines | 126/270 |
| 4,118,541 A | 10/1978 | Power et al. | 428/452 |
| 4,521,571 A | 6/1985 | Ishido et al. | 525/437 |
| 4,603,074 A * | 7/1986 | Pate et al. | 428/172 |
| 4,686,275 A | 8/1987 | Bryant et al. | 528/295.5 |
| 4,746,576 A | 5/1988 | Ozu et al. | 428/421 |
| 4,898,981 A | 2/1990 | Falk et al. | 568/28 |
| 4,931,582 A * | 6/1990 | Heilmann et al. | 560/172 |
| 4,946,922 A | 8/1990 | Reisch et al. | 528/76 |
| 5,043,221 A | 8/1991 | Koleske | 428/413 |
| 5,045,624 A | 9/1991 | Falk et al. | 528/70 |
| 5,097,048 A | 3/1992 | Falk et al. | 549/511 |
| 5,166,230 A | 11/1992 | Stecker | 523/500 |
| 5,166,288 A | 11/1992 | Kanai et al. | 525/443 |
| 5,206,066 A | 4/1993 | Horacek | 428/113 |
| 5,230,954 A | 7/1993 | Sakamoto et al. | 428/332 |
| 5,302,462 A | 4/1994 | Shah et al. | 428/482 |
| 5,324,764 A | 6/1994 | Fujita et al. | 524/377 |
| 5,361,164 A | 11/1994 | Steliga | 359/455 |
| 5,476,721 A | 12/1995 | Simeone et al. | 428/482 |
| 5,543,200 A | 8/1996 | Hargis et al. | 428/122 |
| 5,576,095 A | 11/1996 | Ueda et al. | 428/224 |
| 5,637,657 A | 6/1997 | Anton | 525/445 |
| 5,637,722 A | 6/1997 | Boivin et al. | 548/211 |
| 5,649,828 A | 7/1997 | Kawashima | 434/411 |
| 5,650,483 A | 7/1997 | Malik et al. | 528/402 |
| 5,654,450 A | 8/1997 | Malik et al. | 549/511 |
| 5,663,289 A | 9/1997 | Archibald et al. | 528/414 |
| 5,668,250 A | 9/1997 | Malik | 528/402 |
| 5,668,251 A | 9/1997 | Malik et al. | 528/402 |
| 5,674,951 A * | 10/1997 | Hargis et al. | 525/410 |
| 5,681,890 A | 10/1997 | Tanaka et al. | 524/539 |
| 5,703,194 A | 12/1997 | Malik et al. | 528/70 |
| 5,807,977 A | 9/1998 | Malik et al. | 528/402 |
| 6,033,737 A | 3/2000 | Johnson et al. | 427/385.5 |
| 6,180,243 B1 | 1/2001 | Johnson et al. | 428/424.6 |
| 6,423,418 B1 | 7/2002 | Callicott et al. | 428/458 |

FOREIGN PATENT DOCUMENTS

| | | |
|---|---|---|
| EP | 348 350 | 12/1989 |
| WO | 96/18699 | 6/1996 |
| WO | 96/23828 | 8/1996 |
| WO | 99/26992 | 6/1999 |
| WO | 99/45079 | 9/1999 |
| WO | 00/46270 | 8/2000 |

OTHER PUBLICATIONS

Conner, A.H., "Urea-Formladehyde Adhesive Resins," from Polymeric Materials Encyclopedia, vol. 11, J.C. Salamone, Ed., Copyright 1996 by CRC Press, Inc., pp. 8496-8501.*

* cited by examiner

*Primary Examiner*—William Phillip Fletcher, III
(74) *Attorney, Agent, or Firm*—Arthur M. Reginelli; David G. Burleson

(57) ABSTRACT

A method for preparing a substrate having an adherent, durable, flexible, and stain resistant layer. The layer is formed by applying a composition that includes (i) the reaction product of a polyester and a polyoxetane having at least one carboxylic acid end group and at least one pendant —$CH_2$—O—$(CH_2)_n$—Rf group and (ii) an amino resin curative. The substrate may be printed or embossed or both. The coated substrate has both stain resistant properties and dry erase properties.

24 Claims, No Drawings

METHOD OF MAKING AN EASILY CLEANABLE POLYMER LAMINATE

This application is a continuation of U.S. Ser. No. 09/847,909, filed on May 2, 2001, now abandoned which is a divisional of U.S. Ser. No. 09/244,711, filed on Feb. 4, 1999, now U.S. Pat. No. 6,423,418, which is a continuation-in-part of U.S. Ser. No. 09/035,595, filed Mar. 5, 1998, now abandoned, which are incorporated herein by reference.

FIELD OF INVENTION

This invention relates to laminates having improved stain resistance due to the incorporation of a polymer having repeat units from an oxetane monomer having pendant fluorinated groups into a stain resistant surface layer. The stain resistant layer can also be adhered to a variety of substrates including polyesters, paper, polyolefins etc. The coatings exhibit dry erase characteristics when dry erase markers are used.

BACKGROUND OF INVENTION

U.S. Pat. No. 4,603,074 sets forth a polyester-amino resin composition that can form a stain resistant layer on plasticized polyvinyl chloride substrates. While this coating was very good with respect to stain resistance and abrasion resistance, it would be desirable to have further increases in cleanability without using solvents, while maintaining stain resistance and abrasion resistance.

A variety of polymeric coatings and surface treatments for natural and synthetic materials have been developed to enhance the dirt and stain release characteristics. Some of the more effective ones to date allow for reapplication of the anti-soil treatment after cleaning (such as with carpets) or in tents.

Dry erase boards and ink or marker pens therefore are popular replacements for chalkboards. A variety of relatively nonporous writing surfaces have been developed along with special dry erase markers that are specially designed to leave strong well defined continuous marks that can be erased with a dry cloth or eraser. U.S. Pat. Nos. 3,834,823; 3,922,457; 3,949,132; 4,746,576; 4,988,123 and 5,324,764; disclose such technology and are herein incorporated by reference for their teachings on dry erase systems.

U.S. Pat. No. 5,650,483 describes the preparation of oxetane monomers useful to form oxetane polymers with pendant fluorinated chains. The oxetane polymers were characterized as having low surface energy, high hydrophobicity, and a low coefficient of friction. That patent is incorporated by reference herein for its teachings on how to prepare the oxetane monomers and polymers. In the reference the oxetane polymers could be formulated with isocyanates to form crosslinked compositions. Additional patents issued on variations of the oxetane monomers and polymers. These were U.S. Pat. Nos. 5,654,450; 5,663,289; 5,668,250, and 5,668,251 also incorporated herein by reference.

SUMMARY OF INVENTION

According to the present invention, an improved stain and abrasion resistant polymeric layer was developed by incorporating a minor amount of a hydroxyl terminated polymer having repeat units from an oxetane monomer having pendant fluorinated groups thereon into a polyester-amino resin composition. The hydroxyl terminated polymer may have other repeat units such as derived from the ring opening polymerization of cyclic ethers including tetrahydrofuran and/or more conventional ring opening polymerization of oxetane or epoxy monomers. Excellent stain release and abrasion release are observed with as little as 0.1, 0.2 or 0.5 to 10 or 15 parts by weight of repeat units from the oxetane monomer with pendant fluorocarbon groups based on 100 parts of polyester resin and amino resin in the dry coating. The coating may be as thin as 0.1 to 2 or 4 mil (thousandths of an inch) thick. One preferred embodiment is a layer of a flexible vinyl chloride polymer coated with said polyester-amino resin composition in solvent and heated to cure and adhere the resin to the vinyl chloride polymer layer with removal of the solvent. This provides the flexible vinyl chloride polymer layer with a coating which is stain resistant or which can readily be cleaned (either dry or with solvent) without significant abrasion to remove stains.

The vinyl chloride layer may be a vinyl chloride polymer, which is a plastisol coated and fused or is a plasticized vinyl chloride polymer composition which has been calendered or extruded. The vinyl chloride may be applied to a backing, substrate or support. In either case the polyvinyl chloride layer (about 1 to 30 or 100 mils thick) can be printed one or more times. The printed layer can be embossed, before and/or after printing, and finally coated with a layer of a solution of a said polyester-amino resin composition and cured to provide the vinyl chloride polymer layer with an outer stain resistant layer about 0.1 to 2 or 4 mils or more thick.

DISCUSSION OF DETAILS AND PREFERRED EMBODIMENTS

The reactive polyester-amino resin for use as the outer or top coating on a substrate is prepared from a solution of a reactive polyester (alkyd resin) and an amino resin in a solvent (such as methyl ethyl ketone, water, alcohols, or combination thereof) containing a catalyst such as p-toluene sulfonic acid and is applied at a temperature desirably of at least about 150, 200, 250, or 400° F. or more (66, 93, 121 or 204° C.) to cause curing or cross-linking of the polyester resin and the amino resin. The reactive polyester-amino resin composition may be applied to a substrate (e.g. vinyl chloride polymer, polyester, cellulosic, polyolefin composition) directly or with an intermediate tie layer. The substrate may be with or without a backing or substrate, with or without the printing and with or without the embossing. A preferred embodiment includes the catalyzed reactive polyester-amino resin solution being applied over a tie layer to an embossed and printed compounded and plasticized vinyl chloride polymer composition carried on a suitable backing or substrate. Such vinyl chloride polymer based substrates are readily available from wallcovering manufacturers.

The polyester resins (alkyd resins) are made by a condensation polymerization reaction, usually with heat in the presence of a catalyst, or a mixture of a polybasic acid and a polyhydic alcohol. Fatty monobasic oils or fatty acids, monohydroxy alcohols and anhydrides may be present. The polyester contains active hydrogen atoms, e.g., carboxylic acid groups and/or hydroxyl groups for reaction with the amino resin. Example of some acids to use to form the alkyd resin or reactive polyester are adipic acid, azelaic acid, sebacic acid, terephthalic acid, phthalic anhydride, and so forth. Examples of some polybasic alcohols include ethylene glycol, propylene glycol, diethylene glycol, dipropylene glycol, glycerine, butylene glycol, 2,2-dimethyl-1,3-propanediol, trimethylol propane, 1,4-cyclohexanedimethanol, pentaerythritol, trimethylolethane and the like. Mixtures of the polyols and polycarboxylic acids can be used. An example of a suitable reactive polyester is the condensation product of trimethylol propane, 2,2-dimethyl-1,3-propanediol, 1,4-cyclohexanedimethanol, phthalic anhydride and adipic acid. Mixtures of these reactive polyester or alkyd resins can be used. Alkyd resins are well known as shown by the "Encyclopedia of Polymer Science and Technology," Vol. 1, 1964, John Wiley & Sons, Inc., pages 663-734; "Alkyd Resins," Martens, Reinhold Publishing Corporation, New York, 1961 and "Alkyd Resin Technology," Patton, Interscience Publishers, a division of John Wiley and Sons, New York, 1962. Some unsaturated polybasic acids and unsaturated polyols may be used in the condensation reaction but are generally undesirable. The reactive polyester (alkyd resin) is usually added to the amino resin while dissolved or suspended in a solvent, e.g. such as a mixture of polyester in a ketone and an alkyl acetate at about 60-80% solids or a mixture of polyester in alkyl alcohols and alkylene glycol alkyl ethers.

Alternatively to using a separate polyester and hydroxyl terminated polymer including repeat units from an oxetane monomer having a pendant pendant $-CH_2-O-(CH_2)_n-Rf$ one can react said hydroxyl terminated polymer into the polyester thus replacing two components with a single component. The hydroxyl terminated polymer is more completely bound into the network as a result of prereacting the polyester forming components with the hydroxyl terminated polymer and is therefore less likely to be removed from the coating by wear or cleaning. In the claims the polyester including the including repeat units derived from copolymerizing said hydroxyl terminated polymer into said polyester is described as a reactive polyester resin including therein at least one repeat unit derived from copolymerizing into said polyester a hydroxyl terminated polymer including repeat units from an oxetane having a pendant $-CH_2-O-(CH_2)_n-Rf$ group. One skilled in the art would be able to optimize reaction conditions for forming such a polyester such that the oxetane repeat units are incorporated into the polyester. Such reaction conditions may include prereaction of the dibasic acid and the oxetane polymer having a pendant $-CH_2-O-(CH_2)_n-Rf$ in a separate reaction and then adding the remaining diacids and polyols to complete the polymerization of the polyester.

The amino resin to be reacted with the reactive polyester is an alkylated benzoguanamine-formaldehyde, an alkylated urea-formaldehyde or, preferably, an alkylated melamine-formaldehyde resin. Mixtures of these resins can be used. The alcohol used to modify the benzoguanamine-formaldehyde, urea-formaldehyde or melamine-formaldehyde resin can be n-butanol, n-propanol, isopropanol, ethanol or methanol and so forth. These amino resins are well known and include those set forth in "Aminoplastics," Vale et al, Iliffe Books Ltd., London, 1964; "Amino Resins," Blair, Reinhold Publishing Corporation, New York, 1959, "Modern Plastics Encyclopedia 1980-1981," pages 15, 16 and 25 and "Encyclopedia of Polymer Science And Technology," John Wiley & Sons, Inc., Vol. 2, 1965, pages 1 to 94.

Sufficient amounts by weight of the reactive polyester and amino resin are employed to provide a stain resistant, layer having good durability and flexibility and having good adhesion to the substrate. These materials are desirably cured at temperatures of at least 150, 200, 250 or 400° F. or more (66, 93, 121, or 204° C.) for effective times in the presence of a minor amount by weight of an acidic catalyst such as boric acid, phosphoric acid, acid sulfates, hydrochlorides, phthalic anhydride or acid, oxalic acid or its ammonium salts, sodium or barium ethyl sulfates, aliphatic or aromatic sulfonic acids such as p-toluene sulfonic acid (preferred), methane sulfonic acid and the like. It is important that the stain resistance imparted by the polyester and amino resin be optimized by controlling things such as glass transition temperature, crosslink density and the presence of molecules that may act as plasticizers or other molecules that may transport or attract staining molecules in the coating. Prior to curing flatting agents or other additives can be added to the mixture of the reactive polyester and amino resin.

The hydroxyl terminated polymer(s) including repeat units from an oxetane having a pendant $-CH_2-O-(CH_2)_n-Rf$ group are prepared. These can be prepared according to the teachings of U.S. Pat. Nos. 5,650,483; 5,668,250 and 5,663,289 hereby incorporated by reference for those teachings. The oxetane monomer desirably has the structure

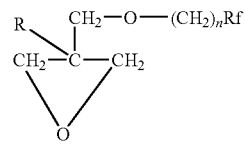

wherein n is an integer from 1 to 3 and Rf, independently, on each monomer is a linear on branch alkyl group of 1 to 20 carbon atoms with a minimum of 25, 50 or 75 percent of the H atoms of said Rf being replaced by F and optionally up to all of the remaining H atoms being replaced by I, Cl or Br, or each Rf, independently, being an oxaperfluorinated polyether having from 4 to 60 carbon atoms; R being H or an alkyl of 1 to 6 carbon atoms; preferably Rf has at least 85 and more preferably at least 95% of said H atoms replaced by F. Preferably said linear or branched alkyl group is of from 1 or 3 to 7 or 10 carbon atoms.

The repeat units from said oxetane monomers desirably have the structure

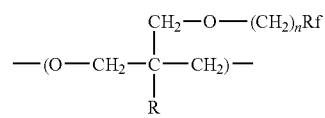

where n, Rf, and R are as described above.

The hydroxyl terminated polymer(s) including repeat units from said oxetane monomers can have one or more terminal hydroxyl groups. They desirably have number average molecular weights from about 250, 500, 1,000 or 5,000 to about 50,000 or 100,000. The polymer(s) can be a homopolymer or a copolymer of two or more different oxetane monomers. The polymer may also be a copolymer of cyclic ether molecules having from 2 to 4 carbon atoms in the ring such as tetrahydrofuran and one or more oxetane monomers as described in the previously incorporated U.S. Pat. No. 5,668,250. The copolymer may also include copolymerizable substituted cyclic ethers such as substituted tetrahydrofurans. The repeat unit from a tetrahydrofuran monomer has the formula to $-(O-CH_2-CH_2-CH_2-CH_2-)$. The hydroxyl terminated polymer optionally includes a cyclic tetramer of said oxetane monomer which may be a byproduct of the polymerization. In some embodiments, said hydroxyl terminated polymer includes up to 10, 20 or 30 wt % of said tetramer based on the weight of said hydroxyl terminated polymer(s).

It is desirable that the polymer including repeat units from an oxetane having a pendant $-CH_2-O-(CH_2)_n-Rf$ group has one or more hydroxyl groups in that this provides a possible mechanism for this polymer to be chemically bound into the polyester-amino resin composition. It is acknowledged that the amount of such bound polymer has not been measured in the examples and it may be a small or large percentage of the total polymer with said oxetane repeat units. In some embodiments it may be desirable to prereact the hydroxyl terminated polymer with the polyester component to increase the percentage of hydroxyl polymer bound into the coating. It is also acknowledged that the percentage of the polymer with said oxetane repeat units and the oxetane repeat units themselves may not be uniformly distributed through the bulk of the coating. Said oxetane repeat units may be disproportionately present at the surface of the coating due to the low surface tension of those repeat units.

The amount of the various components in the coating will be generally specified in relationship to 100 parts by weight of the polyester resin and the amino resin crosslinking agent. The weight ratio of polyester resin (neat) to amino resin (neat) can vary widely but desirably is from about 10:90 to 90:10 and more desirably from about 20:80 to 80:20. Generally it is more desirable to match the moles of reactive groups on the polyester to within 10 to 20% to the number of moles of reactive groups on the amino resin. The number of moles of reactive groups can be determined by dividing the weight of the component by the equivalent weight for the component. The term "neat" after polyester and amino resin does not exclude using polyesters and amino resins that are received dissolved in solvents but rather specifies that the amount used is to be recalculated based on the weight without the solvent. For the purposes of this disclosure no distinction will be made whether the amino resin crosslinks the polyester resin or vice versa.

The amount of carriers and/or solvent(s) in the coating composition can vary widely depending on the coating viscosity desired for application purposes, and solubility of the components in the solvent. The solvent(s) can be any conventional solvent for polyester-amino resin systems. These carriers and/or solvents include but are not limited to water, alkyl alcohols of 1 to 10 carbon atoms, ketones of from 3 to 15 carbon atoms e.g. methyl ethyl ketone or methyl isobutyl ketone, alkylene glycols and/or alkylene glycol alkyl ethers having from 3 to 20 carbon atoms, acetates and their derivatives, ethylene carbonate, etc. Illustrative U.S. patents of the carrier and/or solvent systems available include U.S. Pat. Nos. 4,603,074; 4,478,907; 4,888,381 and 5,374,691 hereby incorporated by reference for their teachings both of carriers and/or solvent systems and of polyesters and amino resins. The amount of solvent(s) can desirably vary from about 20 parts by weight to about 400 parts by weight per 100 parts by weight of total polyester resin and amino resin.

The amount of the oxetane repeat units having a pendant $CH_2$—O—$(CH_2)_n$Rf group is desirably from about 0.1 or 0.2 to about 10 or 15 parts by weight and more desirably from about 0.5 to about 10 or 15 parts by weight per 100 parts total weight of said polyester resin and amino resin. Of course if the hydroxyl terminated polymer(s) including repeat units from said oxetane has a significant amount of repeat units from tetrahydrofuran or other repeating unit therein, the hydroxyl terminated polymer's weight will exceed that of said oxetane repeat units.

The amount of catalyst is an amount that effectively catalyzes the mutual crosslinking of the polyester and amino resins under the crosslinking conditions chosen (usually elevated temperatures). As the crosslinking temperature increases above 150, 200, 250 or 400° F. (66, 93, 121 or 204° C.) the amount of catalyst can be reduced. Effective amounts of catalyst can vary from about 0.1, 0.5 or 1 to about 6 or 8 parts by weight and preferably from about 2 or 3 to about 6 parts by weight per 100 parts by weight total of said polyester and amino resins.

Conventional flattening agents can be used in the coating composition in conventional amounts to control the gloss of the coating surface to an acceptable value. Examples of conventional flattening agents include the various waxes silicas, aluminum oxide, alpha silica carbide, etc. Amounts desirably vary from about 0 to 0.1 to about 5 or 10 parts by weight per 100 parts by weight total of said polyester and amino resins. For most embodiments high gloss is preferred.

Additionally other conventional additives for polyester and amino resin compositions or for other clear coating applications in general can be used in the composition. Examples include viscosity modifiers, antioxidants, antiozonants, processing aids, pigments, fillers, ultraviolet light absorbers, adhesion promoters, emulsifiers, dispersants, etc.

While this disclosure generally teaches applying the dry-erase coating directly to a substrate, it also provides for intermediate coating(s) between the substrate and the dry erase coating. These intermediate coating(s) can be decorative coatings to provide a colored background or a printed (patterned) background. Alternatively or additionally they can be a buffer between the substrate and the dry-erase coating preventing interaction between the dry-erase coating and the substrate. Or they can prevent interaction between components in the substrate and components in the dry-erase coating (e.g. keeping plasticizer from the substrate from migrating into the coating). An intermediate coating(s) may also function to improve adhesion of the dry erase coating to the substrate when adhesion is a concern. An example where adhesion might be improved is with a polyolefin (polyethylene or polypropylene) substrate which may be plasma or corona surface treated or have a hydrocarbon intermediate adhesive layer applied thereto before the dry-erase coating is applied.

The substrates may be any material which would benefit from a stain resistance or dry-erase coating. Examples include cellulosic products (coated and uncoated paper, boardstock, cardboard, wood and paneling), fibers, synthetic polymers (including polyolefins, polyesters, polycarbonates, polystyrene, poly (methacrylates) and especially highly filled or highly plasticized ones which are more porous towards stains e.g. polyvinyl chloride), metals (requiring temporary or permanent protection from stains), and ceramics.

The coating composition can be prepared by a variety of mixing techniques. Most of the components can be prediluted or pre-combined with other components. When the catalyst, polyester resin, and amino resin are combined they can begin to crosslink. A convenient formulation procedure is to combine the polyester resin, solvent(s), amino resin, and any non catalyst additives in one container. In a separate container the catalyst and optionally solvent can be stored. Shortly before application the catalyst can be combined and mixed with the other components.

The substrate with stain resistant layers of the present invention are particularly useful as dry erase writing surfaces (including boards, posters, papers, clipboards, menus, etc.) wallcoverings, anti graffiti surfaces e.g. in public areas including restrooms, and in kitchens and food preparation areas. However, these stain resistant laminates, also, can be used in the manufacture of tablecloths, shoe uppers, luggage exteriors, upholstery, vehicle interiors and seats, golf bags and other sporting goods and so forth.

The polyvinyl chloride can be an emulsion (plastisol grade) or a suspension grade vinyl chloride polymer. The vinyl chloride polymer can be polyvinyl chloride homopolymer (preferred) or a copolymer of a major amount by weight of repeat units from vinyl chloride and a minor amount by weight from a copolymerizable monomer selected from the group consisting of vinyl acetate, vinylidene chloride and maleic ester. Bulk and solution vinyl chloride polymers, also may be used. Mixtures of vinyl chloride polymers can be used. Vinyl chloride polymers and copolymers are well known and include those set forth in "Vinyl and Related Polymers," Schildknecht, John Wiley & Sons, Inc., New York, 1952; Sarvetnick, "Polyvinyl Chloride," Van Nostrand Reinhold Company, New York 1969; Sarvetnick, "Plastisols and Organosols," Van Nostrand Reinhold Company, New York, 1972 and "Modern Plastics Encyclopedia 1980-1981," October, 1980, Volume 57, No. 10A, McGraw-Hill Inc., New York.

The amount of plasticizer used to plasticize the vinyl chloride polymer to make it flexible may vary from about 20 or 30 to about 100 parts by weight per 100 parts by weight of total vinyl chloride polymer resin more desirably from about 20 or 30 to about 50 or 60 parts by weight for wallpaper applications and from about 60 to about 100 parts by weight for upholstery type applications per 100 parts by weight of total polyvinyl chloride. Any conventional plasticizer for PVC can be used. Examples of plasticizers which may be used are butyl octyl phthalate, dioctyl phthalate, hexyl decyl phthalate, dihexyl phthalate, diisooctyl phthalate, dicapryl adipate, dioctyl sebacate, trioctyl trimellitate, triisooctyl trimellitate, triisononyl trimellitate, isodecyl diphenyl phosphate, tricresyl phosphate, cresyl diphenyl phosphate, polymeric plasticizers, epoxidized soybean oil, octyl epoxy tallate, isooctyl epoxy tallate and so forth. Mixtures of plasticizers may be used.

Other vinyl chloride polymer compounding ingredients are desirably incorporated in the vinyl chloride polymer compositions. Examples of such ingredients are the silicas such as precipitated silica, fumed colloidal silica, calcium silicate and the like, calcium carbonate, ultra violet light absorbers, fungicides, carbon black, barytes, barium-cadmium-zinc stabilizers, barium-cadmium stabilizers, tin stabilizers, dibasic lead phosphite, $Sb_2O_3$, zinc borate, molybdates such as ammonium octa-molybdates, aluminum oxide, aluminum trihydrate and so forth and mixtures of the same. $TiO_2$, red iron oxide, phthalocyanine blue or green or other color pigments can be used. The pigments and the other dry additives preferably are dispersed or dissolved in one or more plasticizers before adding to the plasticized vinyl chloride polymer compositions. These compounding ingredients are used in effective amounts by weight to control color, mildew, stabilization to ultra-violet light and heat, viscosity and so forth of the plasticized vinyl chloride polymer.

The vinyl chloride polymer composition may contain suitable blowing or foaming agents such as sodium bicarbonate, and the organic agents like 1,1-azobisformamide, 4,4-oxybis (benzene sulfonyl-hydrazide), p-toluenesulfonyl hydrazide, or water and so forth to form a cellular or foamed vinyl chloride polymer composition layer or sheet on fusing. The blowing agents may require an activator. Such blowing agents are well known.

Vinyl chloride polymer blending or extender resins, also, can be used in the compositions in a minor amount by weight as compared to the vinyl chloride polymer composition.

The ingredients forming the vinyl chloride polymer composition may be charged to and mixed together in any one of several mixing devices such as a Ross Planetary mixer, Hobart dough type mixer, Banbury, 2-roll rubber mill, Nauta mixer and ribbon blender and so forth.

The vinyl chloride polymer composition can be formed into layers of films which can be unsupported or supported (preferred). Where a vinyl chloride polymer plastisol composition is used, it may be cast on a release surface and heated to fuse it to form a film. Where a plasticized suspension grade vinyl chloride polymer composition is used, it can be calendered or extruded and fused to form a film. Temperatures may vary from about 200 to about 400° F. (93-204° C.). However, it is preferred that in either case the compounded vinyl chloride polymer compositions be supported or have a backing. In the case of the supported vinyl chloride polymer composition, the substrate can be a woven fabric (drill, scrim, cheesecloth, and so forth), a knit fabric, a non-woven fabric, paper etc. The fabric can be continuous, discontinuous, woven, nonwoven, bundled etc and made of cotton, cellulose, nylon, polyester, aramid, glass, rayon or acrylic fibers or cords or mixtures of the same. It may be necessary in some instances to treat the fabric with an adhesive coating or dip to adhere or to improve adhesion of the fabric to the vinyl chloride polymer composition.

The vinyl chloride polymer composition film or layer, supported or unsupported, is preferably printed on the surface with a suitable vinyl chloride polymer receptive ink to form desirable and novel pattern and/or design. Such inks are well known and can be applied by various methods of printing such as by gravure, flexography, screen printing, jet printing, web printing, non-impact printing and so forth as for example, set forth in "Modern Plastics Encyclopedia 1980-1981," pages 464-465. The printing operation may be repeated for up to five times or more to vary the colors and designs at temperatures of desirably from about 150 to about 165° F. (66-74° C.) for each printing step.

The vinyl chloride polymer composition film or layer, supported or unsupported, printed or unprinted, is preferably embossed to texture the vinyl chloride layer to provide a pattern or design for esthetic or functional purposes. Embossing of thermoplastic films, layers or sheets is well known and is usually carried out by passing the film between an embossing roll and a backup roll under controlled pre-heating and post-cooling conditions. See "Modern Plastics Encyclopedia 1980-1981," pages 454-45. Additional decorating or printing can sometimes be done with the above stated inks over the embossed vinyl chloride polymer surface for better aesthetic purposes.

The following examples will serve to illustrate the present invention with more particularity to those skilled in the art.

Preparation of Poly-Fox Materials (U.S. Pat. No. 5,650,483)

A 10 L jacketed reaction vessel with a condenser, thermocouple probe, and a mechanical stirrer was charged with anhydrous methylene chloride (2.8 L), and 1,4-butanediol (101.5 g, 1.13 moles). $BF_3THF$ (47.96 g, 0.343 moles) was then added, and the mixture was stirred for 10 minutes. A solution of 3-Fox (3,896 g. 21.17 moles) in anhydrous methylene chloride (1.5 L) was then pumped into the vessel over 5 hours. The reaction temperature was maintained between 38 and 42° C. throughout the addition. The mixture was then stirred at reflux for an additional 2 hours, after which $^1H$ NMR indicated >98% conversion. The reaction was quenched with 10% aqueous sodium bicarbonate (1 L), and the organic phase was washed with 3% aq. HCI (4 L) and with water (4 L). The organic phase was dried over sodium sulfate, filtered, and stripped of solvent under reduced pressure to give 3,646 g (91.2%) of title glycol, a clear oil. NMR: The degree of polymerization (DP) as determined by TFAA analysis was 15.2 which translates to an equivalent weight of 2804. The THF content of this glycol, as determined by 1 H NMR, was 2.5% wt THF (6.2% mole THF). This was used in Examples 1 and II.

EXAMPLE I

Coating Composition

Melamine resin (Resimene 747, 25.92 g) and polyester resin (Vr-248, Texas Resin, 74.78 g) were mixed with variable amounts of a Poly-FOX-3 polymer available from Aerojet in Sacramento, Calif. Isopropyl acetate 82.00 g and tetrahydrofuran (THF) 8.30 g were added to reduce the viscosity. A small amount of p-toluene sulfonic acid 39.6 g (10% solution in isopropanol) was added and the solution was mixed under shear for 5 minutes. Poly-Fox-3 polymer is a hydroxyl terminated polymer including repeat units from an oxetane monomer having a pendant —$CH_2$—O—$(CH_2)_n$RF group where Rf is $CF_3$.

EXAMPLE II

A smooth PVC film was coated with a solvent borne PVC/acrylate primer. A portion of the primed substrate was coated with the composition of Example I which had no Poly-FOX-3 (Example II Control) and a portion of the substrate was coated with the composition of Example I which had 2 parts by weight of Poly-FOX-3 per 100 parts by weight total of said polyester and melamine resins, (Example IIA). The coatings on Example II Control and Example IIA were cured at 200° F. (93° C.). Commercial dry erase markers were used to mark both examples. The resulting marks were easily removed with a dry cloth or eraser from Example IIA. The Example II Control erased partially but left severe shadowing using a dry eraser.

While in accordance with the patent statutes the best mode and preferred embodiment have been set forth, the scope of the invention is not limited thereto, but rather by the scope of the attached claims.

What is claimed is:

1. A method of providing a laminate, the method comprising:
  a) applying to a substrate a composition comprising
    1) a reactive polyester comprising at least one segment comprising an ether repeat unit that comprises a pendent fluoroalkoxyalkyl group and a reactive hydrogen atom, and
    2) an amino resin; and
  b) allowing said polyester and said amino resin to react so as to form a crosslinked coating where the reactive hydrogen atom reacts with the amino resin, thereby providing said laminate.

2. The method of claim 1, where the composition further comprises a solvent and a catalyst.

3. The method of claim 2, where the solvent is selected from the group consisting of methyl ethyl ketone, water, alcohols, and a combination thereof, and where the catalyst is an acidic catalyst.

4. The method of claim 3, where the catalyst is selected from the group consisting of boric acid, phosphoric acid, acid sulfates, hydrochlorides, phthalic anhydride or acid, oxalic acid, ammonium salts of oxalic acid, sodium ethyl sulfates, barium ethyl sulfates, aliphatic sulfonic acids, aromatic sulfonic acids, p-toluene sulfonic acid, methane sulfonic acid, and mixtures thereof.

5. The method of claim 2, wherein the amino resin is selected from the group consisting of alkylated benzoguanamine-formaldehyde resin, alkylated urea-formaldehyde resin, alkylated melamine-formaldehyde resin, and mixtures thereof.

6. The method of claim 5, where the amino resin is alkylated by reaction with an alcohol selected from the group consisting of n-butanol, n-propanol, isopropanol, ethanol, and methanol.

7. The method of claim 5, where the amino resin is a melamine-formaldehyde resin.

8. The method of claim 2, where the pendent fluoroalkoxyalkyl group is defined by the formula —$CH_2$—O—$(CH2)_n$—Rf, where n is an integer from 1 to 3 and Rf is, independently for each monomer unit, a linear or branched alkyl group including 1 to 20 carbon atoms, wherein at least 25% of the hydrogen atoms of said Rf group are replaced by fluorine.

9. The method of claim 8, where at least 95% of said hydrogen atoms of said Rf group are replaced by fluorine.

10. The method of claim 8, where said pendent fluoroalkoxyalkyl group derives from an oxetane monomer having the formula

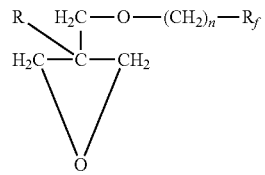

where n is an integer from 1 to 3 and Rf is a linear or branched alkyl group including 1 to 20 carbon atoms, wherein at least 20% of the hydrogen atoms of said Rf group are replaced by fluorine and, where R is a hydrogen atom or an alkyl group having 1 to 6 carbon atoms.

11. The method of claim 2, where said reactive polyester is the reaction product of a hydroxyl terminated polymer that comprises said ether repeat unit and a polyester.

12. The method of claim 2, wherein the weight ratio of said reactive polyester to said amino resin is about 10:90 to 90:10.

13. The method of claim 2, wherein the weight ratio of said reactive polyester to said amino resin is about 20:80 to 80:20.

14. The method of claim 1, where said substrate is selected from the group consisting of cellulosic products, fibers, polyolefins, polyesters, polycarbonates, polystyrene, polymethacrylates, polyvinyl chloride, metals and ceramics.

15. The method of claim 1, where the reactive polyester includes a carboxylic acid or hydroxyl group.

16. A method of providing a laminate, the method comprising:
  a) applying to a substrate a composition comprising
    1) a polyester alkyd resin comprising at least one segment comprising an ether repeat unit that comprises a pendent fluoroalkoxyalkyl group, and
    2) an amino resin selected from the group consisting of alkylated benzoguanamine-formaldehyde resin, and alkylated urea-formaldehyde resin, alkylated melamine-formaldehyde resin, and mixtures thereof; and
  b) allowing said polyester and said amino resin to react so as to form a crosslinked coating, thereby providing said laminate.

17. The method of claim 16, where the composition further comprises a solvent and a catalyst.

18. The method of claim 17, where the solvent is selected from the group consisting of methyl ethyl ketone, water, alcohols, or a combination thereof, and where the catalyst is an acidic catalyst.

19. The method of claim 17, where the pendent fluoroalkoxyalkyl group is defined by the formula —CH2—O—(CH2)$_n$—Rf, where n is an integer from 1 to 3 and Rf is, independently for each monomer unit, a linear or branched alkyl group including 1 to 20 carbon atoms, wherein at least 25% of the hydrogen atoms of said Rf group are replaced by fluorine.

20. The method of claim 19, where at least 95% of said hydrogen atoms of said Rf group are replaced by fluorine.

21. The method of claim 16, where the polyester alkyd resin includes an active hydrogen atom.

22. The method of claim 21, where the active hydrogen atom is associated with a carboxyl or hydroxyl end group.

23. The method of claim 16, where the substrate includes decorating or printing.

24. The method of claim 16, where the amino resin is a melamine-formaldehyde resin.

* * * * *